(No Model.)  2 Sheets—Sheet 1.

J. BURNS.
Steam Water Meter.

No. 230,232.  Patented July 20, 1880.

Witnesses:
C. J. Mattison.
E. G. Day.

Inventor:
JOHN BURNS,
by William H. Low,
Attorney.

(No Model.) 2 Sheets—Sheet 2.

J. BURNS.
Steam Water Meter.

No. 230,232. Patented July 20, 1880.

Witnesses:
C. J. Mattison.
E. G. Day

Inventor:
JOHN BURNS,
by William H. Low,
Attorney.

United States Patent Office.

JOHN BURNS, OF TROY, NEW YORK, ASSIGNOR OF ONE-HALF OF HIS RIGHT TO THEODORE E. HASLEHURST, JESSE B. ANTHONY, AND STEPHEN E. BABCOCK, OF SAME PLACE, ONE-SIXTH TO EACH.

STEAM-WATER METER.

SPECIFICATION forming part of Letters Patent No. 230,232, dated July 20, 1880.

Application filed April 20, 1880. (No model.)

*To all whom it may concern:*

Be it known that I, JOHN BURNS, of Troy, in the county of Rensselaer and State of New York, have invented a new and useful meter for measuring the consumption of steam for steam-heating and other kindred purposes, of which the following is a specification.

My invention relates to the mode herein set forth for determining the quantity of steam used by the weight or quantity of water produced by the condensation of the steam; and it consists of an automatic device operated by the weight of the water passing through it, substantially as hereinafter described; and my said device is composed, essentially, of two close hollow vessels, attached, by means of swing-joints, to the opposite ends of a vibratory beam or frame, and connected, by means of suitable pipes, to a valve-chest provided with ports that are alternately opened and closed by the oscillations of said valve-chest on a stationary valve. Each of said vessels is provided with an automatic valve that opens into a waste-pipe that is fitted to slide telescopically in a hollow standard that connects with the drain-pipe for carrying off the waste water. A shifting weight or weights placed on the vibrating beam and arranged to operate by the oscillations thereof accurately regulate the quantity of water that must flow into each vessel before the beam will oscillate, and a recording device operated by the oscillations of the beam automatically registers the quantity of water passing through the apparatus.

Figure 1:
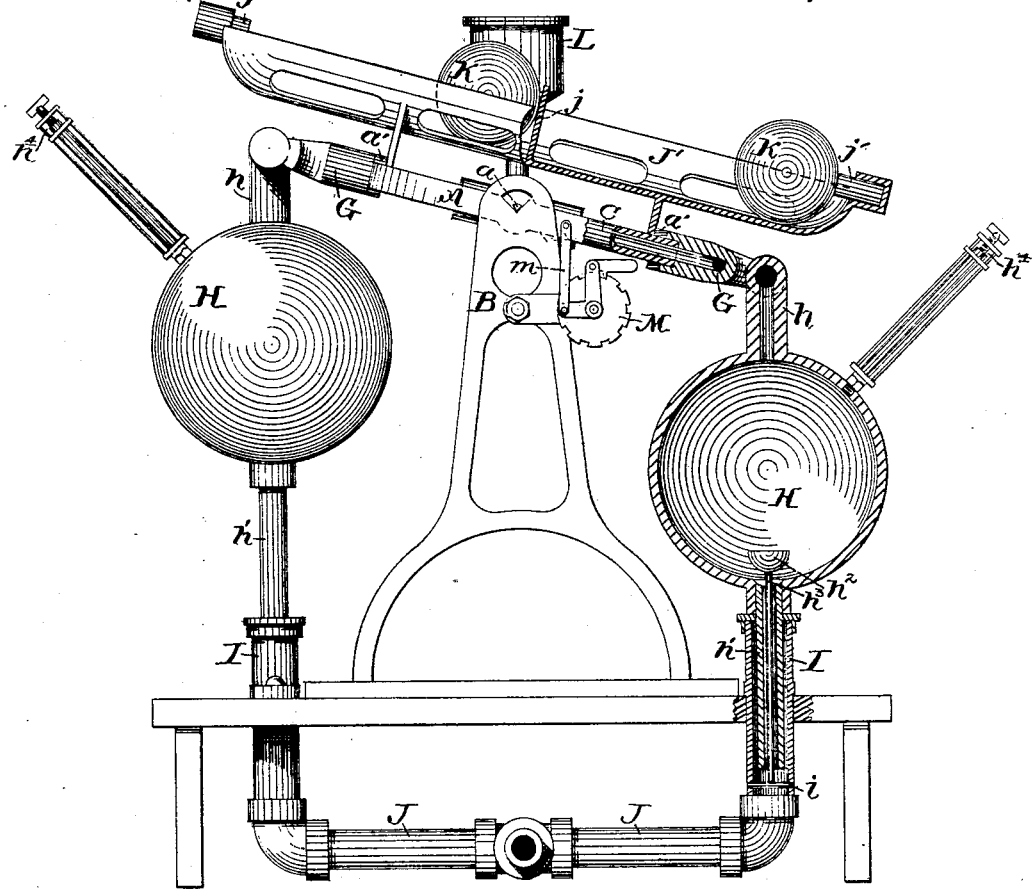
Figure 2:
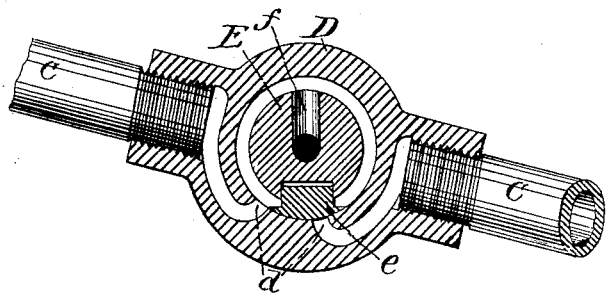
Figure 3:
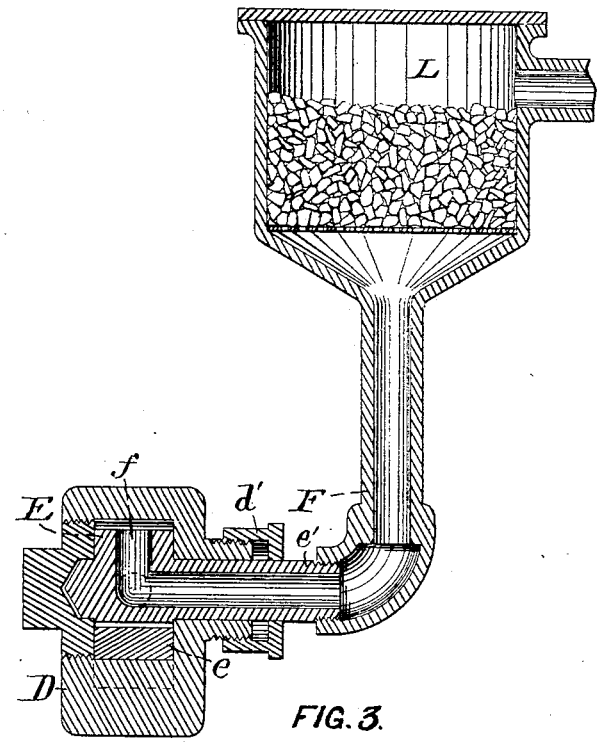
Figure 4:
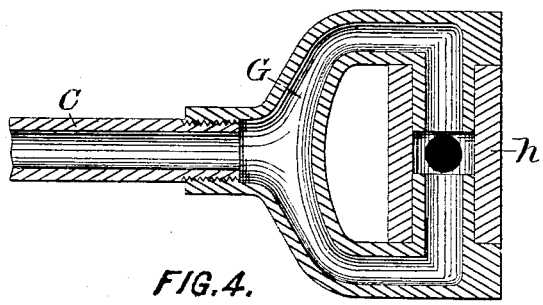

In the accompanying drawings, which form a part of this specification, and to which reference is herein made, Figure 1 is a side view of my meter, the right side of the figure being shown in section and the left side in elevation; Fig. 2, an enlarged longitudinal section of the valve and valve-chest; Fig. 3, an enlarged transverse section of the valve, valve-chest, and filter; and Fig. 4, an enlarged horizontal section of the swing-joint.

As illustrated in the drawings, A is the frame of the vibrating beam, arranged to oscillate on the knife-edge centers $a$ in the upper part of the gallows-frame B. Through eyes $a'$ at each end of the beam the pipes C are inserted, and their inner ends are fastened in a valve-chest, D, the pivotal center of which corresponds with the centers $a$, on which the beam oscillates. The said valve-chest is provided with two ports, $d$, that communicate at their proper ends with the pipes C. Within the valve-chest there is a stationary hub or center, E, which is independent of said chest and forms the inner end of the pipe F, by which the water is supplied to the meter.

The hub E is made smaller than the bore of the valve-chest, to form a passage through which the water entering through the opening $f$ may reach the ports $d$. The said hub is recessed to receive the valve $e$, which is held sidewise in a stationary position by the recess, but is free to move outward from the center of the hub to compensate for its wear. The length of the valve should be proportioned to cover both of the ports $d$ when the beam A is in its midway or horizontal position, so that in all positions of the parts one of the ports $d$ will always be hermetically closed against the admission of water and steam into one of the measuring-vessels. The hollow stem $e'$ of the hub passes out the valve-chest through a stuffing-box, $d'$, to prevent leakage at that point.

The outer end of each one of the pipes C is provided with a hollow yoke, G, which forms a continuous communication to and a swing-joint with the T-pipe $h$, fixed in the top of each one of the spherical vessels H. Leading from the bottom of each of said vessels there is a vertical waste-pipe, $h'$, having at its upper end a puppet-valve, $h^2$, provided with a stem, $h^3$, extending below the bottom of the waste-pipe. The said waste-pipes are adapted to a free sliding movement in the hollow standards I, which connect with the pipes J for conveying the water passing through the meter to the drains. A cross-pin, $i$, inserted through each standard, is arranged in the path of each protruding valve-stem $h^3$, so that as either vessel is depressed its valve-stem will strike a cross-pin and raise its valve $h^2$ from its seat, thereby permitting the water in the depressed vessel to flow out by the force of gravity. An automatic air-valve, $h^4$, of the ordinary construction, is inserted in each vessel H to prevent an accumulation of air therein, and, by expanding when subjected to undue heat, to prevent the escape of any steam that may accidentally enter said vessels.

Above the vibrating beam A there is a trough, J', which is secured to said beam and vibrates therewith. Said trough is divided transversely at its middle by the partition $j$, and is provided at each end with an elastic cushion, $j'$. Two globular weights, K, are placed in the trough J', one on each side of the partition $j$, and are so arranged that they automatically shift their positions with each oscillation of the beam—that is to say, when either end of the beam is depressed the weight on the corresponding side of the partition rolls down to the lowest end of the trough J' and strikes one of the elastic cushions $j'$, and the other weight rolls down toward the middle of the trough, where it lodges against the partition $j$, and where it exerts but little influence over the beam.

A filtering apparatus, L, should be placed in the supply-pipe F, to intercept any dirt that may be carried into any of the pipes by the currents of steam or water, and prevent such dirt from passing into the meter and impeding its proper operation.

A registering device, M, of similar construction to those used on gas-meters, but adapted to denote the quantity of water passing through the meter, is attached to the apparatus and arranged to operate by the oscillations of the beam A through the connection formed by the rod $m$.

The gravity of the weights K and the positions of said weights in relation to the pivotal center of the beam A must be correctly proportioned to insure the admission of a certain known and predetermined quantity of water into the vessel H—that is, the one being filled—before any oscillation of the beam can occur. By attending to this requirement perfect accuracy in the operation of the meter can be obtained.

When preferred, the partition $j$ in the trough J' may be dispensed with, and a single weight, K, used in the place of the two weights shown in the drawings. When this modification is used the weight K shifts at each oscillation of the beam A from one end of the trough J' to the other, instead of running from the end to the center, as when the two weights are used. The operating mechanism should be entirely inclosed in a case, so as to prevent any external interference with it.

The operation of my meter is as follows: The parts of the device being in the positions shown in Fig. 1, the water is forced by the pressure of steam acting behind it into the apparatus through the supply-pipe F. The water then enters the valve-chest D through the opening $f$, and passes into the port $d$, that has passed out from under the valve $e$ by the oscillation of the beam A, and from thence it passes through the pipe C and hollow yoke G into the vessel H, that is, for the time being, in its elevated position. The water continues to flow into said elevated vessel until a sufficient quantity is delivered therein to overcome the gravity of the weight K that is at the depressed end of the beam. When this is accomplished the greater gravity of the filled vessel causes the beam to turn on its center, thereby elevating the empty vessel and depressing the full one, and causing the weights K to reciprocally change their positions with respect to the ends and center of the trough J'. As the filled chamber sinks down the stem $h^3$ of its valve $h^2$ strikes the cross-pin $i$ and forces the valve from its seat, leaving a clear passage for the escape of the water from the vessel. When the empty vessel rises its valve $h^2$ falls into its seat, closing the escape-opening and putting the empty vessel into condition for being filled, and in the manner described each of the vessels H is alternately filled and emptied.

At each complete vibration of the beam A—that is, when one end moves down and up again—the recording device makes one of its primary registrations, and such registrations may, by the ordinary mechanism of registering attachments, be extended and multiplied to any amount required.

In order to secure the accuracy required for the purpose for which this meter is designed, it is absolutely necessary that the passages leading from the supply-pipe F to the measuring-vessels H should be so arranged and governed that an open communication can at no time exist between the said vessels or between the supply-pipe and any other portion of the apparatus, excepting the one leading to the measuring-vessel that is at that time being filled. This construction is rendered necessary in order to prevent the steam that will inevitably rise from the hot water passing through the meter from escaping through an open communication at the points above named into the measuring-vessel that is being emptied, and from thence passing out without being recorded by the registering device, thereby defeating the object of my invention; and, in order to guard against the damage that will accrue from the steam that escapes from the hot water that passes out of the measuring-vessel, it is essential that movable and steam-tight communications should be formed between the measuring-vessels and the pipe for conveying the water to the drains. This I effect by means of the telescopic movement of the water-pipes $h'$ in the hollow standards I. This construction compels the use of the swinging joints formed by the hollow yoke G and the T-pipe $h$, for connecting the pipes C with the vessels H, so that the waste-pipes $h'$ may always be maintained in a vertical position to slide in the standards I.

In producing the condensation of the steam used it is obvious that no additional water should be introduced into the pipes to mix with the water produced by the condensation of the steam, which water, for the purpose of distinguishing it from the water commonly used for producing condensation, I denominate as "steam-water"—that is to say, steam again reduced to its aqueous form.

What I claim as new, and desire to secure by Letters Patent, is—

1. In a meter for measuring the consumption of steam by the weight or quantity of the water resulting from the condensation of the steam used, one or more close vessels attached by means of swinging joints to the pipes for conveying the steam-water into said vessels, and connected to the supply-pipe by means of an automatic valve device, arranged, as herein described, so that one of the ports for admitting the water to said vessels will always be hermetically closed, the said vessels being provided with waste-pipes that are telescopically connected to the drain-pipes, as herein set forth, in combination with an automatic weighing device and an automatic registering device, substantially as specified.

2. The combination, in a steam-water meter, of the vibrating beam A with one or more close vessels, H, connected to pipes C by means of the swing-joints, as herein described, and each provided with a valve, $h^2$, arranged to open automatically when the vessel is depressed, and with waste-pipes $h'$, adapted to slide telescopically into the hollow standards I, as herein specified.

3. The combination, in a steam-water meter, with the vibrating beam A, movable valve-chest D, stationary valve $e$, supply-pipe F, and vessels H, provided with automatic waste-valves $h^2$, of the waste-pipes $h'$, arranged to slide telescopically into the hollow standards I, pipes J, and one or more shifting weights, K, substantially as specified.

JOHN BURNS.

Witnesses:
D. H. HUMPHREY,
C. J. MATTISON.